C. J. GONZALES.
HARROW.
APPLICATION FILED JUNE 20, 1912.

1,047,042.

Patented Dec. 10, 1912.

Witnesses
J. H. Wagner,
A. M. Brooks.

Inventor
Charles J. Gonzales
By Robb & Robb
Attorneys

UNITED STATES PATENT OFFICE.

CHARLES JOSEPH GONZALES, OF BANCKER, LOUISIANA.

HARROW.

1,047,042.  Specification of Letters Patent.  Patented Dec. 10, 1912.

Application filed June 20, 1912. Serial No. 704,849.

*To all whom it may concern:*

Be it known that I, CHARLES J. GONZALES, a citizen of the United States, residing at Bancker, in the county of Vermilion and State of Louisiana, have invented certain new and useful Improvements in Harrows, of which the following is a specification.

This invention relates to harrows and more particularly to that class or type wherein the ground or earth pulverizing members are rotatably mounted on the framework of the implement.

In the present invention it is an object to have the pulverizing members mounted in an elevated position on the framework whereby the harrow is especially adapted for use on sugar cane fields. In the cultivation of sugar cane, it is the custom to leave the stubble in the ground, after the cane has been cut, and from the stubble or roots left the succeeding year's crop grows. It is advantageous to cultivate the stubble or roots for several reasons, namely, the grass and weeds are prevented from growing so rapidly by having the soil pulverized, and much labor with hand implements is saved as well as other field work requisite for the proper cultivation of the plant.

Another object resides in having spaced runners which serve to retain the row which the harrow straddles, in its original formation during the harrowing process as well as affording a means upon which the harrow may be moved.

Figure 1:
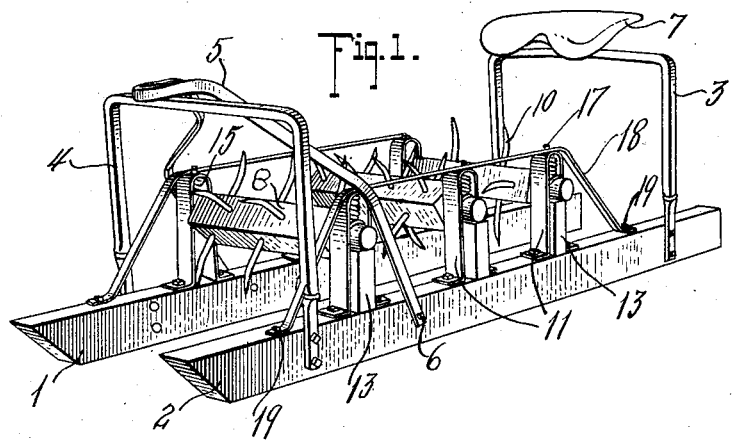
Figure 2:
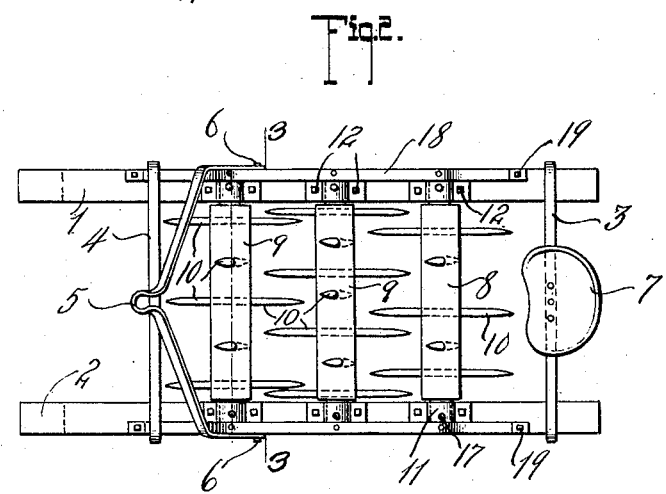
Figure 3:
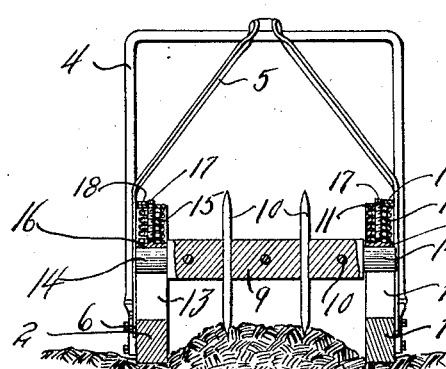

For a full understanding of the present invention, reference is to be had to the following description and to the accompanying drawings, in which, Figure 1 is a perspective view of a harrow constructed in accordance with the present invention. Fig. 2 is a top plan view thereof, and Fig. 3 is a vertical sectional view taken on line 3—3 of Fig. 2.

Referring more particularly to the drawings, the harrow constructed in accordance with the present invention comprises spaced runners 1 and 2 retained in spaced relation by the arches 3 and 4 and the draft rigging 5 which consists of a single length of material bent centrally, and having its terminals pivotally secured to the runners as at 6. This draft rigging normally rests against the front arch 4, whereby the former is retained in an elevated position. For the sake of simplicity the rear arch 3 serves also as a support for the seat 7.

Rotatably mounted between the runners 1 and 2 are a plurality of earth or soil pulverizing members 8, each of said members comprising the body portion 9 and the spikes 10 passing through said body portion 9 and projecting at a distance on each side thereof to come in contact with the soil for pulverizing the latter. The members 8 have their bearings in the vertically disposed guides 11 mounted on the top of the runners 1 and 2, each guide comprising an inverted U shaped member having its extremities flared outwardly and pierced to receive the fastening bolts 12 whereby the guides may be fastened to the runners. Disposed between the arms of each guide member 11, is a bearing block 13 of such a size as to elevate the members 8 to a desired elevation. Interposed between the top of the guides 11 and the axles or trunnions 14 are the springs 15 preferably coiled, and having their lower terminals bearing on the wearing plate 16, the latter conforming to the curvature of the trunnions 14. A set screw 17 is disposed on the top of each guide 11 whereby different tensions may be given the spring 15 to permit the degree of yieldability of the soil pulverizing members 8 desired. To reinforce or brace the vertical guides against forward or rearward movement, when the members 8 are acting upon the soil the brace members 18 are provided, each brace member comprising a single strip of material secured at its extremities to the runner supporting it as at 19, and passing up over the tops of the guides 11 and secured to the latter in a desired manner.

As stated above, the present invention is especially adapted for use on sugar cane fields, after the cane has been cut, for cultivating and preparing the stubble or roots for the succeeding crop. In using the harrow, the frame or body thereof straddles the row as shown in Fig. 3, and as the soil pulverizing members 8 operate on the soil, the runners 1 and 2 prevent the soil from being scattered, and serve to retain the row in its original formation and leave a furrow between each row the same as it is previous to the harrowing. The soil pulverizing members 8 are elevated so as to operate upon the soil to a certain depth only, which may be regulated by the screws 17 and prevent any injury to the roots.

Having thus described the invention, what is claimed as new is:

A harrow comprising spaced runners, frame arches connecting the runners, soil pulverizing members disposed between said runners, and a draft rigging pivotally mounted on the runners and between the arches, said draft rigging being braced by the forward arch and projecting in advance thereof.

In testimony whereof I affix my signature in presence of two witnesses.

CHARLES JOSEPH GONZALES.

Witnesses:
P. N. BROUSSARD,
J. T. BROUSSARD.

Copies of this patent may be obtained for five cents each, by addressing the "Commissioner of Patents, Washington, D. C."